PULSE AMPLITUDE COMPARATOR
Filed May 26, 1960
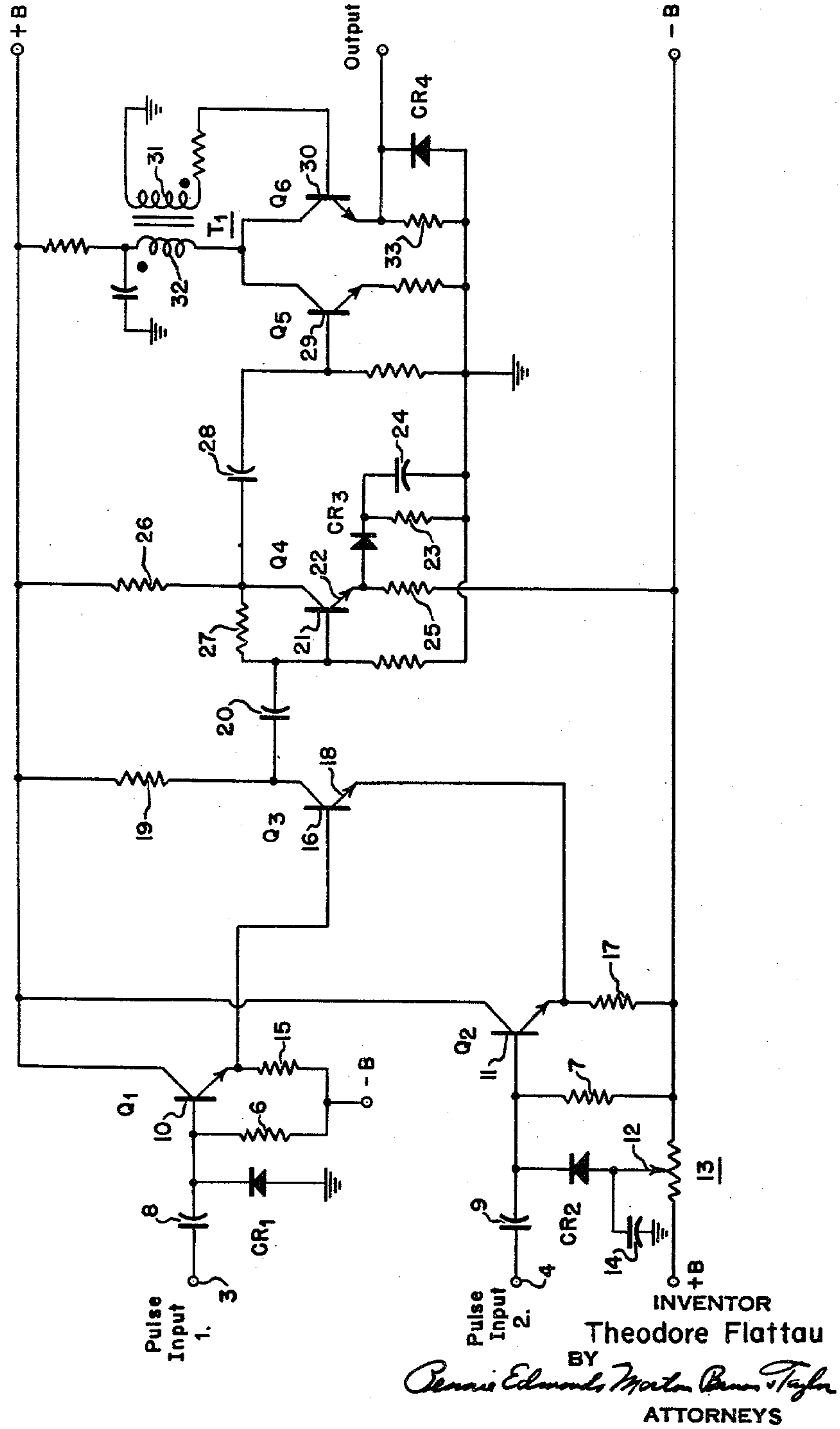
INVENTOR
Theodore Flattau
BY
Pennie Edmonds Morton Barrows Taylor
ATTORNEYS

United States Patent Office 3,196,283
Patented July 20, 1965

3,196,283
PULSE AMPLITUDE COMPARATOR

Theodore Flattau, Williston Park, N.Y., assignor to Cutler-Hammer, Inc., Milwaukee, Wis., a corporation of Delaware Filed May 26, 1960, Ser. No. 32,030
2 Claims. (Cl. 307—88.5)

This invention relates to apparatus for comparing the relative amplitudes of pulses, and particularly to transistor apparatus which yields an output whenever a pulse in one series exceeds the amplitude of a pulse in another series by a selected amount.

In the field of modern electronics there is a continually expanding need for apparatus which will automatically monitor the operations of complex electronic equipment and promptly apprise supervisory personnel of specific circuit malfunctions, or perform control functions. The need for such apparatus exists not only in the field operations of such equipment but also in the production line testing thereof. It is often desirable, for example, for a maintenance or test engineer to be able to continuously compare the amplitudes of pulses produced by one equipment with those produced by another, for example a reference standard.

It is an object of this invention to provide an automatic pulse amplitude comparator which will produce an output warning or control signal whenever a predetermined amplitude disparity exists between two pulse inputs, and particularly a transistorized pulse amplitude comparator which has a high degree of operational stability and reliability, and a low electrical power consumption.

In accordance with the invention, a pair of transistor amplifiers are supplied with respective input pulse signals including the direct-current components thereof. The outputs of these amplifiers are supplied to the base and emitter of a third transistor by D.-C. connections, so that an output in the third transistor is produced whenever the pulse amplitudes applied thereto differ in one direction. Advantageously D.-C. restorers are employed in the input circuits of the pair of transistors, and the D.-C. level of at least one of them is made adjustable so that the magnitude by which a pulse in one input circuit must exceed that of a simultaneously occurring pulse in the other to produce an output may be preset as desired.

In a preferred embodiment the output signals from the third transistor are used to trigger a monostable oscillator so that resultant signals of substantially constant amplitude are obtained for corresponding input pulses whose amplitude difference exceeds the preset amount.

The invention as to organization and manner of operation together with further objects and advantages thereof may best be understood by referring to the preferred embodiment shown in the drawing, and the detailed description which follows.

Referring to the drawing, two inputs 3 and 4 are provided for receiving input pulse signals. The inputs are coupled by capacitors 8 and 9 to the respective bases 10 and 11 of transistors Q1 and Q2. Diodes CR1 and CR2 are connected to the bases of transistors Q1 and Q2, respectively. These diodes function as conventional D.-C. restorers. With the polarities shown, diode CR1 operates to restore the largest negative excursion of the applied pulses to ground potential, whereas diode CR2 functions to restore the largest negative excursion of the applied pulses to a desired D.-C. bias voltage developed at the adjustable arm 12 of potentiometer 13. Potentiometer arm 12 is maintained at A.-C. ground potential by capacitor 14, and can be adjusted to provide any desired bias voltage between +B and −B. Input load resistors 6, 7 are connected to the bases of transistors Q1 and Q2 and to suitable potentials indicated −B. With the polarities as shown, diodes CR1 and CR2 conduct in the absence of input pulses and maintain the D.-C. bias of the bases of Q1 and Q2 at ground and the potential of potentiometer arm 12, respectively.

Transistors Q1 and Q2 are connected as conventional emitter-follower amplifiers providing substantially identical and low output impedances. Emitter resistors 15, 17 are connected to −B of the power supply, such as a battery.

A third transistor Q3 has its base and emitter D.-C. connected to the output circuits of Q1 and Q2, respectively. As shown, base 16 of Q3 is connected directly to the emitter of Q1, and emitter 18 of Q3 is connected directly to the emitter of Q2. Thus the pulse outputs of Q1 and Q2, including their D.-C. components, are supplied directly to the base-emitter circuit of Q3. Resistor 19 is connected between the collector of Q3 and +B, forming a collector output circuit.

Transistor Q3 is normally biased (base-emitter) below collector current cutoff in the absence of input pulses. In a practical operating amplifier type 2N338 transistors (NPN type) have been successfully employed in each stage of the comparator with B supply voltages of +12 volts and −12 volts. Under the above circumstances current flow between the emitter and collector of Q3 is initiated when the base is raised approximately 0.7 volt positive with respect to the emitter (or the emitter is made 0.7 volt negative with respect to the base).

In the preferred embodiment shown in the drawing, D.-C. base-emitter bias for Q3 is established by the D.-C. bias levels of the emitters of Q1 and Q2. The level of Q2 can be adjusted by moving the arm 12 of potentiometer 13 which effectively controls the bias current flow through Q2 and resistor 17, and hence controls the D.-C. potential of emitter 18 with respect to base 16. It should be noted that this potentiometer may be adjusted to bias the base of Q2 either more positive or more negative than the base of Q1, and hence emitter 18 of Q3 may be made either positive or negative with respect to base 16. Thus potentiometer 13 serves as an operating control which may be adjusted to establish the amplitude difference level between pulse inputs 1 and 2 at which Q3 is caused to conduct to produce a voltage pulse across collector load-resistor 19.

Normally potentiometer 13 is adjusted so that emitter 18 is biased positive to the base 16 (or less than 0.7 negative) by the amount which gives a response when a pulse in input 1 exceeds a simultaneously occurring pulse in input 2 by the desired amplitude difference.

In the practical operating amplifier referred to above, short duration voltage pulses (e.g. between 0.5 $\mu$sec. and 30 $\mu$sec.) having amplitudes up to 10 volts have been successfully compared. The amplitude difference level between pulse inputs at which a trigger pulse is produced can be preset (by adjusting potentiometer 13) to vary from approximately 0.2 volt up to 3 volts. Greater ranges are of course possible by suitable selection of transistors and circuit parameters. In a typical operating application one input may be a standard reference pulse signal having a substantially constant amplitude with which the other pulse input is to be amplitude compared.

In the specific embodiment shown, pulses produced by Q3 across load resistor 19 are coupled by capacitor 20 to the base 21 of transistor Q4 which functions as a variable gain amplifier. The incremental gain of transistor Q4 is caused to increase for small amplitude pulses supplied to its base, and decrease for larger amplitude pulses. For small amplitude pulses (of negative polarity), most of the current flow from emitter 22 is returned to chassis ground via diode CR3 and resistor 23. Since resistor 23 is by-passed to ground by capacitor 24 and the resistance of diode CR3 is very small, for low level pulses there is substantially no emitter current feedback or degeneration and the gain of Q4 is a maximum. When higher amplitude pulses are supplied to the base input of Q4, however, diode CR3 effectively opens and the emitter current is forced to flow through emitter current feedback resistor 25. The added emitter current feedback effectively reduces the base to collector gain of transistor Q4 for large amplitude pulses supplied to the base.

The amplitude selective feedback afforded by CR3 effectively protects transistor Q4 against base-emitter junction breakdown for high-level pulses, and at the same time tends to minimize amplitude differences in the amplified pulses developed across collector load resistor 26. Prevention of breakdown in the base-emitter junction of Q4 eliminates a junction recovery time delay which would otherwise be present with high-level input pulses. The emitter current feedback thereby improves the response time of transistor Q4. Gain stabilization of Q4 is afforded by conventional collector-to-base negative feedback which is supplied by resistor 27.

The variable amplitude positive polarity pulses produced across resistor 26 are coupled by capacitor 28 to the base 29 of transistor Q5 which functions as a triggering amplifier for a monostable blocking oscillator comprising transistor Q6 and transformer T1. As shown, the base 30 of Q6 is returned to ground through the secondary winding 31 of T1 and hence this transistor is biased below collector current cutoff. Negative polarity trigger pulses produced across the primary winding 32 of T1 are reversed in polarity by the transformer and coupled to the base 30 of Q6 by secondary winding 31. Transistor Q6 is triggered into conduction by the aforementioned trigger pulses and produces a single substantially constant amplitude (positive polarity) output indicator pulse across resistor 33 whenever the amplitude of a pulse in input 1 exceeds the amplitude of a simultaneously occurring pulse in input 2 by a predetermined magnitude. The negative backswing of the oscillatory voltage developed at the base of Q6 is sufficiently damped by the breakdown of the base-emitter junction to preclude continuous oscillation. Negative backswing voltage that would normally appear across output resistor 33, due to base-emitter breakdown, is shunted to ground by diode CR4 and thus a single positive polarity indicator or warning pulse is produced at the output of the comparator whenever a predetermined voltage amplitude disparity exists between corresponding input pulses. The warning pulses may be advantageously connected to an indicator device such as a graphic recorder or the like, or used for control purposes.

An important feature of the apparatus of the invention is its ability to accurately compare relative pulse amplitudes over a wide dynamic input range. The symmetry of the input circuits combined with the low collector current flow through Q3 assures excellent comparison linearity over a wide temperature range. Although NPN type transistors are shown in the preferred embodiment described above, it will be apparent to those skilled in the art that PNP type transistors may be substituted where desired, with corresponding changes in the bias polarities.

Although a preferred embodiment of the invention has been described herein, it will be understood that various changes and modifications may be made within the scope of the invention as set forth in the following claims.

I claim:

1. A pulse amplitude comparator for comparing a pair of input pulse signals which comprises a pair of transistor amplifiers having respective input and output circuits, means for supplying input pulse signals to said transistor input circuits, respectively, including the direct-current components thereof, a third transistor having a collector output circuit, direct-current connections from the output circuits of said pair of transistor amplifiers to the base and emitter of said third transistor, respectively, for applying amplified input pulse signals in like polarity thereto including the respective direct-current components thereof and producing a response in said collector output circuit when the amplitudes of amplified input pulses simultaneously applied to said base and emitter differ in a predetermined direction, and a monostable oscillator connected to be triggered by responses in said collector output circuit for yielding output signals of substantially constant amplitude for corresponding simultaneous occurrences of pulses in said input circuits which differ by a predetermined amount in one direction.

2. A pulse amplitude comparator for comparing a pair of input pulse signals which comprises a pair of transistor stages connected as emitter-followers, means for supplying input pulse signals to respective input circuits of said stages in like polarity, respective direct-current restorers in said input circuits, a third transistor having a collector output circuit, direct-current connections from the emitter circuits of said pair of transistor stages to the base and emitter of said third transistor respectively, means for establishing direct-current biases in said emitter circuits to normally cut-off output current in said third transistor, whereby a signal in said output circuit of the third transistor occurs when the difference between the instantaneous amplitudes of pulses simultaneously occurring in said input circuits exceeds a predetermined amount in one direction, adjustable bias means for at least one of said direct-current restorers for changing the direct-current level in the corresponding transistor stage to thereby change the relative input pulse amplitudes giving an output signal in said third transistor, and a monostable oscillator connected to be triggered by an output signal in said third transistor for yielding resultant output signals of substantially constant amplitude for corresponding simultaneous occurrences of pulses in said input circuits whose amplitude difference exceeds said predetermined amount in one direction.

References Cited by the Examiner

UNITED STATES PATENTS

| | | | |
|---|---|---|---|
| 2,816,230 | 12/57 | Lindsay. | |
| 2,851,638 | 9/58 | Wittenberg | 307—88.5 |
| 2,966,597 | 12/60 | Bonn et al. | 307—88.5 |
| 2,967,951 | 1/61 | Brown | 307—88.5 |
| 2,972,117 | 2/61 | Jarmotz et al. | |
| 2,987,629 | 6/61 | Germain | 307—88.5 |
| 3,085,227 | 4/63 | Brown | 307—88.5 XR |

OTHER REFERENCES

Pub. I, Millman and Taub, Pulse and Digital Circuits, McGraw-Hill, New York, 1956 (page 564 relied on).

Shea: Principles of Transistor Circuits, 1955, Wiley & Sons (page 51 relied on).

ARTHUR GAUSS, *Primary Examiner*.

GEORGE N. WESTBY, *Examiner*.